United States Patent

Montgomery

[15] 3,659,115

[45] Apr. 25, 1972

[54] LINEAR SWEEP CIRCUIT

[72] Inventor: Gary D. Montgomery, Kent, Wash.

[73] Assignee: The Boeing Company, Seattle, Wash.

[22] Filed: Mar. 9, 1970

[21] Appl. No.: 17,686

[52] U.S. Cl. ..............................307/228, 307/304, 315/313, 315/27 TD

[51] Int. Cl. ..........................................................H03k 4/50

[58] Field of Search .............307/228; 328/184, 304; 315/13, 315/13 CG, 27 TD

[56] References Cited

UNITED STATES PATENTS

| | | | |
|---|---|---|---|
| 3,447,099 | 5/1969 | Lockshaw | 307/228 |
| 3,225,221 | 12/1965 | Scott | 307/293 |
| 3,539,825 | 11/1970 | Hardway | 307/228 |
| 3,001,190 | 9/1961 | Fryklund | 315/26 |
| 3,028,521 | 4/1962 | Szegho | 315/31 TV |
| 3,497,725 | 2/1970 | Lorditch, Jr. | 307/273 |
| 3,473,054 | 11/1969 | Wieczorek | 307/293 |
| 3,378,701 | 4/1968 | Frank | 307/290 |
| 3,480,801 | 11/1969 | Smith | 307/273 |

OTHER PUBLICATIONS

IBM Technical Disclosure Bulletin, " Wide Range Timer," Vol. 9, No. 3, Aug. 66.

Design and Application of Transistor Switching Circuits by L. A. Delhom, 1968, p. 235

*Primary Examiner*—Benjamin A. Borchelt
*Assistant Examiner*—R. Kinberg
*Attorney*—Glenn Orlob, Kenneth W. Thomas and Conrad O. Gardner

[57] ABSTRACT

A logic controlled sweep circuit effecting high linearity over a wide range of sweep frequencies. A timing capacitor charging circuit is coupled to the gate electrode of a field effect transistor, and a Schmitt trigger logic circuit responsive to the sweep output signal at the source of the field effect transistor provides a reset pulse to a J-K flip-flop circuit to discharge the timing capacitor and control the sweep output signal.

5 Claims, 3 Drawing Figures

PATENTED APR 25 1972 3,659,115

INVENTOR.
GARY D. MONTGOMERY

BY

ATTORNEY

LINEAR SWEEP CIRCUIT

The present invention relates to beam deflection circuitry and, more particularly, to a linear sweep circuit for use in cathode ray tube deflection systems.

In cathode ray tube deflection systems, highly linear saw-tooth current waves have been desired in the deflection yoke windings of the cathode ray tube to reduce distortion in the display. Waveshaping and feedback networks, as shown for example in U. S. Pat. No. 3,488,554 to Voige, have been utilized in improving linearity of the sweep signal generated in television system applications. However, there has now become a need for sweep generators fulfilling other important requirements. The novel deflection systems of the type herein disclosed have placed additional requirements on the sweep generators utilized in these systems, e.g., good linearity is required over a wide range of sweep frequencies.

It is therefore an object of this invention to provide a linear sweep generator exhibiting good linearity characteristics over a wide range of sweep frequencies.

It is a further object of this invention to provide constant sweep voltage outputs which are independent of sweep speed.

It is another object of this invention to provide means for preventing further trigger pulses from initiating further sweeps until the initial sweep has been completed.

It is yet another object of the present invention to provide logic circuit means for effecting commencement of sweep in a minimum time after completion of a previous sweep.

Other objects of this invention will become apparent from the following description when taken in conjunction with the accompanying drawings in which.

Figures 1, 2, 3:
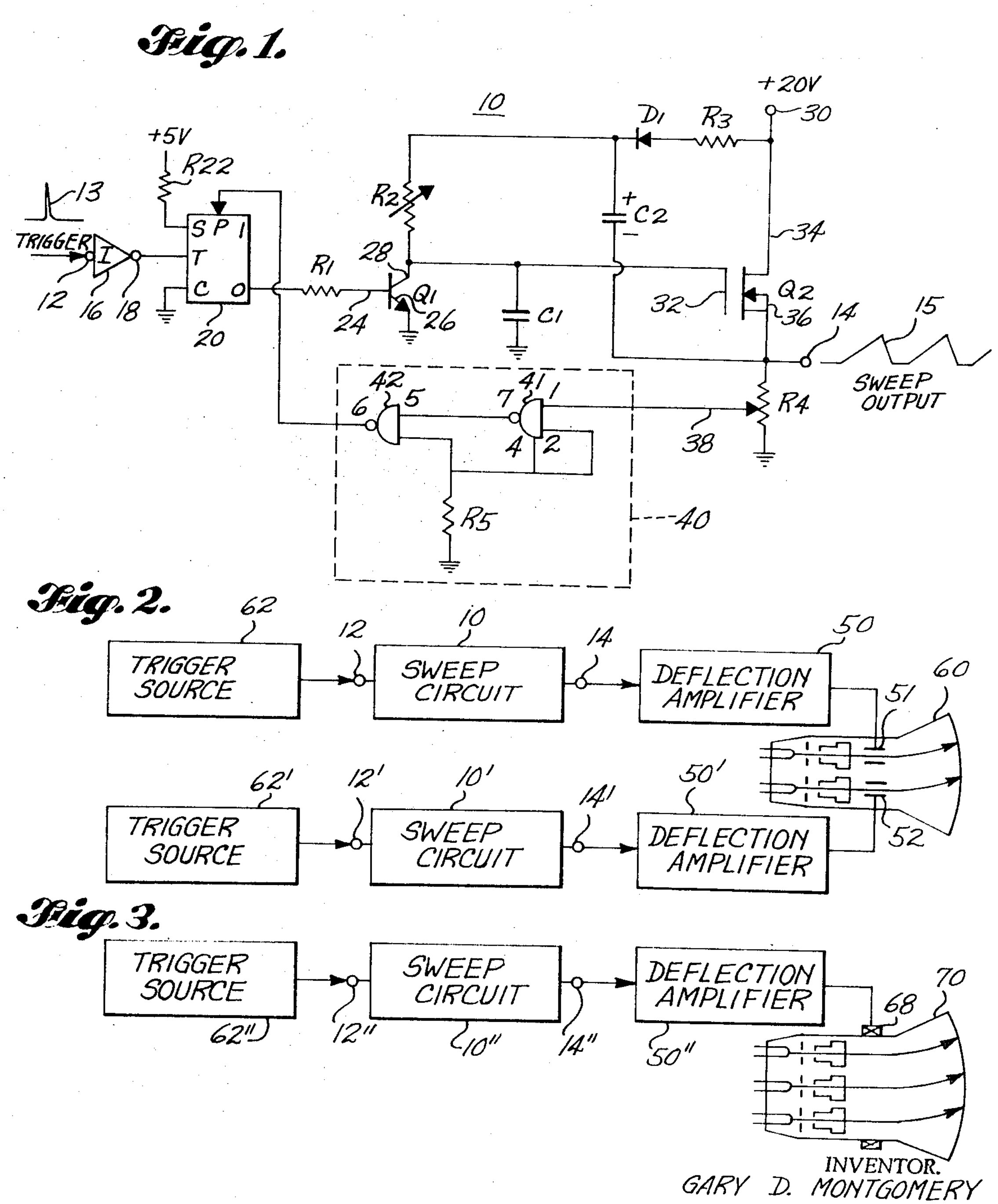
FIG. 1 is a schematic diagram of a sweep generator in accordance with an embodiment of this invention.
FIG. 2 is a block diagram of a deflection system for one type of display device utilizing a pair of sweep generators of the type shown in FIG. 1.
FIG. 3 is a block diagram of another deflection system for another type of display device utilizing a single sweep generator of the type shown in FIG. 1.

Turning now to FIG. 1, there is shown a sweep generator circuit 10 having an input terminal 12 to which there is applied a trigger pulse 13 which initiates the sweep. The sweep signal illustrated by the waveform 15 is made available at output terminal 14 in response to trigger pulse 13. The positive going trigger pulses 13 may comprise synchronizing pulses at the standard television vertical or horizontal scanning rates depending upon whether the scanning generator 10 is to be utilized to provide scanning signals for vertical or horizontal deflection amplifiers. Trigger pulses 13 may, of course, be repetitive and at frequencies other than the above or of other sequence and control the frequency of sweep generator 10 for use in other various types of deflection systems where special effects and/or special character generation by computer or otherwise is desired. Connected to input terminal 12 of sweep generator 10 is inverting buffer 16, having the output terminal 18 thereof connected to the clock pulse input terminal T of J–K flip-flop circuit 20. In the sweep generator circuit 10 shown in FIG. 1, inverting buffer 16 comprised a Fairchild Corp. type $\mu$L 900 circuit, and the J–K flip-flop 20 utilized in the sweep circuit 10 having the circuit parameters illustrated and hereinafter described comprised a Fairchild Corp. type $\mu$L 923 circuit. Clear pulse input terminal C of the J–K flip-flop circuit 20 is coupled to reference ground potential with set input terminal S being coupled through resistor R22 to a constant voltage input comprising a positive potential of 5 volts. The logical ONE true output terminal 1 of J–K flip-flop circuit 20 provides an unblanking signal output which may be used for controlling the electron beam or beams of the cathode ray tube display device. The logical ZERO false output terminal O is coupled by resistor R1 to the base electrode 24 of switching transistor Q1. The emitter electrode 26 of switching transistor Q1 is coupled to reference potential while the collector electrode 28 thereof is connected through the series path of variable resistor R2, diode D1, and resistor R3 to terminal 30 to which terminal is connected a source of fixed potential comprising a positive 20 volt source which is utilized for furnishing a charging current to timing capacitor C1 which is connected between the collector 28 of switching transistor Q1 and reference ground potential. Gate terminal 32 of field effect transistor Q2 is directly connected to the junction between timing capacitor C1 and collector electrode 28 of switching transistor Q1. Drain electrode 34 of field effect transistor Q2 is connected to terminal 30, and source electrode 36 thereof is connected to output terminal 14 and through variable resistor R4 to reference ground potential while the variable tape 38 of variable resistor R4 is coupled to a first input terminal 1 of Schmitt trigger logic circuit 40. The output terminal 6 of Schmitt trigger logic circuit 40 is coupled back to reset terminal P of J–K flip-flop circuit 20. The Schmitt trigger logic circuit 40 utilized comprised a Fairchild Corp. type $\mu$L 914 circuit. The cathode of diode D1 is connected to the source terminal 36 of field effect transistor Q2 through boostrap capacitor C2 to complete the scanning generator 10 circuit connections.

Turning now to a description of the scanning generator 10 circuit operation it should be noted that before the trigger pulse initiates the sweep, the J–K flip-flop 20 is preset with a logical ZERO true output at output terminal O thereof. This output keeps switching transistor Q1 saturated, resulting in complete discharge of the timing capacitor C1 through the low collector-emitter resistance of switching transistor Q1.

A positive going trigger pulse input 13 to invertor 16 changes the state of J–K flip-flop 20, resulting in a logical ZERO false output at output terminal O thereof. Since no base current is now fed to switching transistor Q1, the timing capacitor C1 is free to charge to a higher potential by the current flowing through the series path of resistor R3, diode D1, and variable resistor R2. The gate terminal 32 of field effect transistor Q2 rises in potential as a charge accumulates on capacitor C1. Field effect transistor Q2 is connected in source follower mode of operation and the source terminal 36 voltage of transistor Q2 rises linearly with the gate voltage at gate electrode 32, and differs from the gate potential only by a gate-source offset voltage of the particular transistor Q2 used. Transistor Q2 should preferably be an enhancement mode MOS FET type transistor.

The cathode of diode D1 is connected to the source terminal 36 of transistor Q2 through a bootstrap capacitor C2. Due to the bootstrapping action provided by capacitor C2, the timing capacitor C1 receives a constant charging current which results in a desired linear sweep output. The circuit shown in block 40 comprises a first NOR gate 41 and a second NOR gate 42 connected in a Schmitt trigger configuration with a variable input threshold. Adjustment of variable tap 38 of variable resistor R4 determines the point at which a positive output voltage appears at output terminal 6 of Schmitt trigger logic circuit 40. This positive output voltage is applied to reset input terminal P of J–K flip-flop 20. When this reset input appears at the J–K flip-flop 20, the logical ZERO output at output terminal O becomes true, resulting in saturation of switching transistor Q1 which provides a discharge path for timing capacitor C1 and causes the sweep output voltage 15 at output terminal 14 to be reduced to zero. Sweep generator circuit 10 is now in its quiescent state ready for another trigger pulse 13 to initiate a new sweep.

Schmitt trigger means 40 with variable input threshold in the feedback path from output terminal 14 to reset input terminal P of J–K flip-flop 20 provides predictable high speed switching in linear sweep generator 10. Sweep generator 10 provides a simple design utilizing few components while providing good linearity over a wide range of sweep frequencies and only timing capacitor C1 must be varied to change the sweep period; e.g., where capacitor C1 has a value of 47 picofarads, a fast sweep having a period of in the order of 1 microsecond is achieved, and with a change in the circuit of C1 only up to a value of 1 microfarad a sweep of around 30 milliseconds duration is achieved. It will be readily recognized by those skilled in the art that such a range of sweep generator sweep period changes achievable solely by capacitor switching is of great importance in test oscilloscope applications. One of the circuit feature contributions of variable input threshold Schmitt trigger 40 is accurate control of sweep amplitude regardless of changes in sweep speed when the value of timing capacitor C1 is changed. A further important circuit feature contribution provided by J–K flip-flop 20 in sweep generator circuit 10 is that once a sweep is initiated, further trigger pulses at input terminal 12 and in inverted form at clock pulse input T are ineffective until a full sweep has been completed and Schmitt trigger circuit 40 has reset J–K flip-flop 20. Reset to the starting point achieved with the circuit parameters illustrated and described herein has occurred in only about 2 percent of the total sweep time.

In the exemplary scanning generator circuit of FIG. 1 according to the invention, components and electrical values successfully utilized are as follows:

| | | |
|---|---|---|
| Resistors: | | |
| | R1 | 470 ohms |
| | R2 | 50 K ohms variable |
| | R3 | 20 K ohms |
| | R4 | 10 K ohms variable |
| | R5 | 33 ohms |
| | R22 | 680 ohms |
| Capacitors: | | |
| | C2 | 150 mfd. |
| Transistors: | | |
| | Q1 | 2 N 3641 |
| | Q2 | 2 N 3796 |

Illustrated in FIG. 2 is a deflection system which incorporates a pair of sweep circuit generators 10 and 10' of the type shown in FIG. 1. A first deflection circuit utilizing sweep generator 10 provides a sweep output at output terminal 14 which is supplied to deflection amplifier 50 which in turn is connected to the horizontal deflection plates 51 of a first electron gun of cathode ray tube 60. A second deflection circuit utilizing sweep generator 10' provides a sweep output at output terminal 14' which is supplied to deflection amplifier 50' which in turn is connected to the horizontal deflection plates 52 of a second electron gun of cathode ray tube 60. A trigger source 62 is coupled to input terminal 12 of sweep circuit 10 and provides synch pulses for driving sweep circuit 10 while a trigger source 62' provides synch pulses to input terminal 12' of sweep circuit 10'. Trigger sources 62 and 62' may provide synchronized synch pulses in which case a common trigger pulse source may be utilized or the relationship between the synch pulses from trigger sources 62 and 62' may be controlled and programmed as desired, depending upon the deflection and consequent display desired to be formed on the screen of cathode ray tube 60 by the two electron guns employed therein. Sweep circuits 10 and 10' are the FIG. 1 type sweep generators with sweep period and sweep amplitudes adjusted in the respective sweep amplifiers by the values of C1 and settings of R4 in the respective amplifiers 10 and 10' in accordance with the sweep desired of the first and second electron beams forming the composite display scanned on the screen of cathode ray tube 60. It should be noted that deflecting means 51 and 52 may comprise the vertical deflection plates where electrostatic deflection is utilized instead of the horizontal plates as described heretofore.

Turning now to the deflection system shown in FIG. 3, it can be seen that the sweep generator 10'' is supplying at its output terminal 14'' a sweep voltage amplified by deflection amplifier 50'' which in turn drives horizontal deflection coil 68. A further vertical deflection circuit of the same type but at the vertical scanning rate may be utilized to drive the vertical deflection coil. While only three guns generating three electron beams are shown in cathode ray tube 70, because the sweep is linear more beams may be utilized to display a whole line of characters or other information in just on linear sweep. Because of the use of a plurality of beams instead of one, speed and brightness of display are increased over the use of certain conventional displays using a single beam. Adjustment of sweep period may be made by variation in the value of capacitor C1 in sweep circuit 10'' which is the sweep generator circuit of the same type as shown in FIG. 1.

There has been described a linear sweep voltage generator for generating a sweep voltage having constant amplitude and other features which may be utilized in sweep systems of various types including those given by way of example in FIG. 2 and FIG. 3. Other modifications and embodiments of the invention will be apparent to those skilled in the art, and the above description and accompanying drawings shall therefore be interpreted as illustrative and not in the limiting sense.

What is claimed is:

1. In combination:

a first timing capacitor;

a first charging path connected to one side of said first timing capacitor for charging said first timing capacitor from a source of potential;

a switching transistor, said first timing capacitor coupled in parallel across the switching path of said transistor;

a bistable flip-flop circuit coupled to the control electrode of said switching transistor for turning said transistor on and off to correspondingly discharge and enable the charging of said timing capacitor;

a capacitive boostrap circuit comprising a second capacitor coupled between said source of reference potential and an output terminal for providing a linear charging rate to said first capacitor;

a field effect transistor having a gate electrode connected to said first timing capacitor so as to cause conduction of said field effect transistor upon charging of said capacitor to a predetermined voltage level, and a variable input threshold Schmitt trigger logic circuit operative in response to the conduction of said field effect transistor to reset said bistable flip-flop circuit, and control sweep amplitude regardless of changes in sweep speed when the value of said timing capacitor is changed.

2. An electrical circuit for selectively generating sawtooth signal waves comprising in combination:

a first capacitor having first and second terminals, said first terminal coupled to a source of potential and said second terminal connected to reference potential;

a switching transistor having a base, emitter and collector electrodes, said collector and emitter electrodes connected in series circuit between said first terminal and reference potential; the improvement comprising in combination therewith;

a field effect transistor having gate, source and drain electrodes, said gate electrode connected to said first terminal, said drain electrode connected to said source of potential;

a J–K flip-flop circuit having set, reset, clear and clock input terminals and first and second output terminals, said set terminal connected to a positive reference potential, said clock pulse input terminal coupled to pulse source means, said clear input terminal coupled to reference potential, and said first output terminal coupled to said base electrode of said switching transistor;

a Schmitt trigger logic circuit coupled to said source electrode and responsive to said sawtooth signal waves generated at said source electrode and having the output terminal thereof coupled to said reset input terminal of said J–K flip-flop circuit.

3. The combination of claim 1 wherein said first timing capacitor has a capacitance value of 47 pico farads for providing a sweep output signal having a period of in the order of 1 microsecond.

4. The combination of claim 1 wherein said first timing capacitor has a capacitance value of 1 microfarad for providing a sweep output signal of about 30 milliseconds duration.

5. A cathode ray sweep circuit for generating sweep output signals at the output terminal thereof in response to synchronizing pulses applied at the input terminal thereof comprising:

a first capacitor;

a switching transistor having collector, emitter and base electrodes, said collector and emitter electrodes connected across said first capacitor;

means including a source of potential and a first variable resistor coupled in series circuit with said first capacitor;

a second capacitor coupled in series circuit between said source of potential and said output terminal;

a field effect transistor connected between said source of potential and said output terminal and having the gate electrode thereof coupled to said first capacitor;

a Schmitt trigger logic circuit having an input terminal and an output terminal;

a second variable resistor connected between said output terminal and reference potential and having the variable tap thereof connected to the input terminal of said Schmitt trigger logic circuit; and a J–K flip-flop circuit having set, reset, clear and clock input terminals and first and second output terminals, said set terminal connected to a positive reference potential, said clock pulse input terminal coupled to a synchronizing pulse source, said clear input terminal coupled to reference potential, said first output terminal coupled to said base of said switching transistor, and said reset terminal coupled to said output terminal of said Schmitt trigger logic circuit.

* * * * *